United States Patent
Niessen et al.

(10) Patent No.: US 11,970,170 B2
(45) Date of Patent: Apr. 30, 2024

(54) CONTROLLING A DRIVE SYSTEM FOR AN AXLE OF A MOTOR VEHICLE

(71) Applicant: GKN Automotive Ltd., Birmingham (GB)

(72) Inventors: Harwin Niessen, Hürth (DE); Michael Höck, Neunkirchen-Seelscheid (DE)

(73) Assignee: GKN Automotive Ltd., Birmingham (GB)

(*) Notice: Subject to any disclaimer, the term of this patent is extended or adjusted under 35 U.S.C. 154(b) by 540 days.

(21) Appl. No.: 17/256,262

(22) PCT Filed: Jul. 5, 2018

(86) PCT No.: PCT/EP2018/068259
§ 371 (c)(1),
(2) Date: Dec. 28, 2020

(87) PCT Pub. No.: WO2020/007472
PCT Pub. Date: Jan. 9, 2020

(65) Prior Publication Data
US 2021/0229663 A1    Jul. 29, 2021

(51) Int. Cl.
*B60W 30/18* (2012.01)
*B60K 17/02* (2006.01)
(Continued)

(52) U.S. Cl.
CPC ........... *B60W 30/182* (2013.01); *B60K 17/02* (2013.01); *B60W 10/023* (2013.01);
(Continued)

(58) Field of Classification Search
CPC .. B60W 30/182; B60W 10/023; B60W 10/20; B60W 30/18145;
(Continued)

(56) References Cited

U.S. PATENT DOCUMENTS 6,817,434 B1    11/2004   Sweet
8,739,915 B2*   6/2014    Hoeck ................ B60K 23/0808
                                                    180/245
(Continued)

FOREIGN PATENT DOCUMENTS

CN    102141098 A    8/2011
CN    105916719 A    8/2016
(Continued)

OTHER PUBLICATIONS

International Search Report and Written Opinion for PCT/EP2018/068259 dated Mar. 26, 2019 (14 pages; with English translation).
(Continued)

*Primary Examiner* — Tisha D Lewis
(74) *Attorney, Agent, or Firm* — Bejin Bieneman PLC

(57) ABSTRACT

A drive system for an axle of a motor vehicle can be controlled. The drive system can have at least one drive unit driving a drive shaft, a first output shaft, and a second output shaft, as well as first and second clutches connecting the drive shaft to the first and second output shafts, respectively. A control unit of the drive system controls the clutches to operate at least at certain operating points with a micro-slip control in which a speed differential between the drive shaft and the output shaft of >0 revolutions per minute (RPM) and <50 RPM is set for the respective clutch. A travel state of the motor vehicle can be detected, including detecting: traveling straight ahead and cornering in the pull mode, and a control strategy can be selected and applied for each clutch, wherein the control strategy is different for different travel states.

16 Claims, 3 Drawing Sheets

(51) Int. Cl.
*B60W 10/02* (2006.01)
*B60W 10/20* (2006.01)
*B60W 30/182* (2020.01)
*B60K 1/00* (2006.01)
*B62D 5/04* (2006.01)

(52) U.S. Cl.
CPC ...... *B60W 10/20* (2013.01); *B60W 30/18145* (2013.01); *B60K 2001/001* (2013.01); *B60W 2510/0275* (2013.01); *B60W 2510/083* (2013.01); *B60W 2520/406* (2013.01); *B60W 2540/18* (2013.01); *B60W 2710/027* (2013.01); *B60W 2720/406* (2013.01); *B62D 5/0466* (2013.01)

(58) Field of Classification Search
CPC ... B60W 2510/0275; B60W 2510/083; B60W 2520/406; B60W 2540/18; B60W 2710/027; B60W 2720/406; B60W 2050/0083; B60W 10/16; B60W 10/02; B60K 17/02; B60K 2001/001; B62D 5/0466; F16H 2048/204; F16H 2048/205; F16H 2048/36; F16H 2048/364; F16H 2048/22; F16H 2048/24; F16H 2048/26
See application file for complete search history.

(56) References Cited

U.S. PATENT DOCUMENTS

| | | |
|---|---|---|
| 2004/0163856 A1 | 8/2004 | Kroppe |
| 2005/0064987 A1* | 3/2005 | Budal ................... F16H 61/061 477/3 |
| 2005/0209761 A1 | 9/2005 | Elie et al. |
| 2005/0252707 A1 | 11/2005 | Bowen |
| 2012/0158257 A1 | 6/2012 | Stursa et al. |
| 2014/0074368 A1 | 3/2014 | Stares |
| 2016/0356370 A1 | 12/2016 | Richards et al. |
| 2018/0339698 A1* | 11/2018 | Höck ................... B60W 10/08 |

FOREIGN PATENT DOCUMENTS

| | | | | |
|---|---|---|---|---|
| CN | 106414206 A | | 2/2017 | |
| DE | 10260752 A1 | | 7/2004 | |
| DE | 10 2005 034 091 A1 | | 1/2007 | |
| DE | 102007030091 A1 | | 10/2008 | |
| DE | 102007056174 B3 | | 9/2009 | |
| DE | 102008037562 A1 | | 5/2010 | |
| DE | 102011113288 A1 | * | 3/2013 | ............ B60K 17/02 |
| DE | 102015118759 A1 | | 5/2017 | |
| EP | 0967135 A2 | | 12/1999 | |
| EP | 2353916 A1 | * | 8/2011 | ............ B60K 17/02 |
| EP | 2592303 A1 | | 5/2013 | |
| FR | 2850346 A1 | | 7/2004 | |
| JP | H06227272 A | | 8/1994 | |
| JP | H11-254991 A | | 9/1999 | |
| JP | H11254991 A | | 9/1999 | |
| JP | 2003063265 A | | 3/2003 | |
| KR | 20180005314 A | * | 1/2018 | ............ B60W 10/02 |

OTHER PUBLICATIONS

JPO Notification of Reasons for Rejection dated Apr. 12, 2022 for Application No. JP2021-500053 (6 pages; with English translation).
China Intellectual Property Office First Notice of Examination Action mailed Jan. 4, 2024 for related application No. CN201880095392.0 (20 pages; with English machine translation).

* cited by examiner

CONTROLLING A DRIVE SYSTEM FOR AN AXLE OF A MOTOR VEHICLE

CROSS-REFERENCE TO RELATED APPLICATIONS

This application is a national stage of, and claims priority to, Patent Cooperation Treaty Application No. PCT/EP2018/068259, filed on Jul. 5, 2018, \which application is hereby incorporated herein by reference in its entirety.

BACKGROUND

Drive systems for an axle of a motor vehicle can be provided for the transmission and the splitting of a torque provided by the drive unit as required, for example. A drive system of this type is known from DE 10 2007 030 091 A1, for example.

A micro-slip control of a clutch which is disposed between a motor and a transmission is known from DE 10 2007 056 174 B3, for example. The torque transmitted by a clutch is automatically adapted to the torque provided by the drive unit by the slip control unit.

SUMMARY

Disclosed herein is a control system for a drive system in which the wheels of an axle can in each case be connected to a common drive shaft by way of dedicated clutches of said wheels. The drive system comprises at least one drive unit (e.g. an electric machine or an internal combustion engine), a drive shaft driven by the drive unit, a first output shaft and a second output shaft (of the common axle), and a first clutch connecting the drive shaft to the first output shaft and a second clutch connecting the input shaft to the second output shaft. Furthermore provided is a control unit at least for controlling the clutches (optionally for additionally controlling the drive unit and for determining the rotating speeds of the drive shaft and the output shafts). The clutches are assigned to the output shafts of a common axle.

A method according to the features of claim 1 contributes to this end. Advantageous embodiments are the subject matter of the dependent claims. The features individually specified in the claims can be combined with one another in a technologically meaningful way and can be supplemented by explanatory substantive matter from the description and details from the figures, wherein further embodiment variants of the invention are shown.

Further disclosed is a method for controlling a drive system for an axle of a motor vehicle. The drive system has at least one drive unit, a drive shaft driven by the drive unit, a first output shaft and a second output shaft, as well as a first clutch connecting the drive shaft to the first output shaft and a second clutch connecting the drive shaft to the second output shaft, and furthermore a control unit for controlling the clutches. The clutches are able to be operated at least at certain operating points (in particular continuously during operation of the motor vehicle) with a micro-slip control in which a speed differential between the drive shaft and the output shaft of more than zero revolutions per minute and of at most 50 revolutions per minute, in particular at most 20 revolutions per minute, is set on the respective clutch.

The method comprises at least the following steps:
a) establishing a travel state of the motor vehicle, wherein at least the following travel states are detected or determined, respectively: traveling straight ahead and cornering in a pull mode;

b) selecting and applying a control strategy for each clutch, wherein the control strategy is different for different travel states.

A micro-slip control can provide that a speed differential of greater than zero revolutions per minute is set on the clutch ideally at any point in time. An excessive speed differential should be avoided here because frictional heat is created on account of the slip in the clutch. This frictional heat can lead to overstressing of the clutch.

By way of the micro-slip control it is in particular made possible that the torque required by the drive unit by way of the clutch always corresponds exactly to the torque that is able to be transmitted between a wheel and the road surface. Furthermore, tuning of the motor vehicle, or of the drive system, respectively, can be simplified because the torque requirement is always set according to the slip present. Any parameterization of controllers can therefore be dispensed with.

The control of the drive system can thus take place independently of the actuation of the drive unit. This is particularly advantageous when an operating strategy (for example a hybrid strategy for driving a hybrid motor vehicle) is provided by manufacturers other than the manufacturer of the control unit that controls the clutches.

Straight-ahead travel comprises, in particular, a movement of the motor vehicle along a (essentially) straight route (thus no travel along a curve). Herein, there is in particular no (predefinable, maximum) steering angle of a steering system or of a steering wheel or of the wheels, respectively. Traveling straight ahead also comprises, in particular, routes with a radius of curvature greater than 500 meters.

In contrast, cornering comprises a movement of the motor vehicle along a curved route (thus not driving along a straight route). Herein, there is in particular a (predefinable, minimum) steering angle of a steering system or of a steering wheel. Cornering comprises, in particular, curves with a radius of curvature of less than 1000 meters, in particular a maximum of 500 meters.

A delimitation of straight-ahead travel and cornering can be specified by way of the (determined) steering angle and/or the curvature or curvature radius of the route, respectively, wherein a predefinable limit value for cornering defines a larger steering angle and/or a smaller curvature radius compared to straight-ahead travel. This delimitation value can be variably adjustable and/or predefinable.

In a motorized motor vehicle, the push mode is the travel state in which the drive unit is entrained, thus kept rotating, by the motor vehicle when the force-fit is not disconnected (e.g. when the clutch is not depressed).

In contrast, the travel state in which the drive unit drives the motor vehicle is referred to as the pull mode.

A control strategy can comprise a specific setting and/or a specific functional mode or operating mode, respectively, of a clutch. A plurality of control strategies can be stored and retrieved on at least one storage medium.

(Automatically and/or immediately) upon establishing one of the predefined travel states it is possible that a control strategy which is assigned to this established travel state is selected and applied to the clutch (for the duration of this travel state).

The method for controlling a drive system is in particular provided where two clutches are provided on a common axle of the motor vehicle, wherein one wheel of the motor vehicle is in each case connected to the drive unit of the motor vehicle in a torque-transmitting manner by way of each of the two clutches. The two clutches can replace the otherwise usual differential that can be used to compensate for different speeds of the wheels.

The construction of such clutches and drive systems can be described as follows. For example, multi-disk clutches can be used as clutches, in which multi-disk clutches outer disks are connected in a rotationally fixed manner to an outer disk carrier and inner disks are connected in a rotationally fixed manner to an inner disk carrier, and each disk carrier is connected in a rotationally fixed manner to the drive shaft or the respective output shaft. As a result of the application of a closing force acting in an axial direction (as a result of the activation pressure), the disks, in other clutches the friction partners, are brought into contact with one another, so that a torque can be transmitted from the drive shaft by way of the clutch to the respective output shaft.

At least one of the two clutches can be a hydraulically actuated clutch, preferably both clutches. In the case of a hydraulically activated clutch, the activation pressure is transmitted to the clutch by way of a hydraulic fluid. The hydraulic fluid can be pressurized by way of a pump (which can also be operated electrically).

At least one of the two clutches can be an electrically activated clutch, preferably both clutches. In the case of an electrically activated clutch, the operating pressure is generated directly by an electric machine, for example by a ramp assembly which is able to be rotated by way of the machine.

As a result of the activation of each of the clutches, one wheel of the common axle of the motor vehicle can in particular be connected to the drive unit in a torque-transmitting manner.

At least one clutch is preferably a multi-disk clutch, in particular both clutches.

In particular, the axle is able to be steered by way of a steering system (e.g. comprising a steering wheel, e.g. actuatable by a driver so as to deflect the wheels of the axle) which has a steering drive (e.g. a power steering or similar) for actuating the steering. When cornering in the pull mode, the steering drive is impinged with a restoring torque to reset the steering to the straight-ahead travel state.

As a result of the micro-slip control, a torque of the drive unit can be transmitted to the wheels of the axle in a known distribution. The torques transmitted by way of the respective clutch herein are known at all times. From a difference in these torques it can be derived in particular by way of which restoring torque the steering system is to be (additionally) impinged in order for the steering to be returned to the non-deflected state (straight-ahead travel).

It has been observed that when a torque differential is set on the wheels of one axle (e.g. with limited-slip differentials, or also with axles with two controllable clutches, in which the outside wheel is locked with the clutch; or else as a result of the micro-slip control) in the pull mode, the effect can occur that a restoring torque of the wheels that acts on the steering and that automatically restores the steering without setting a torque differential or without a micro-slip control is no longer present. Therefore, due to e.g. the torque differential generated by the micro-slip control on the steered axle, the situation can now occur that a steering system (e.g. when the user lets go of the steering wheel, thus in the case of a self-acting steering system) remains in the locked state or even changes further to a deflected position.

In particular, the restoring torque is determined as a function of at least one steering lock angle and a torque differential, the torque differential being the difference between a first torque transmitted by way of the first clutch and a second torque transmitted by way of the second clutch.

Preferably, the steering system is set or transferred in a self-acting manner to the straight-ahead travel state by way of the restoring torque (thus without any intervention by a user).

A first control strategy for the straight-ahead travel state comprises in particular a mutually independent micro-slip control for the first clutch and for the second clutch. This means in particular that each clutch is controlled individually, in particular e.g. (exclusively) as a function of the slip in the respective clutch (thus in particular the slip between the inner disk carrier and outer disk carrier of the respective clutch). The torque set on the one clutch herein is not taken into account, in particular by the other clutch, and thus has no direct influence on the control of the latter.

The first control strategy is preferably used for the straight-ahead travel state in the forward gear (forward movement of the motor vehicle) and in the reverse gear (movement of the motor vehicle in the opposite direction, that is to say backward).

In particular, at least the following driving states is additionally detected: cornering in the push mode.

A second control strategy for the travel state cornering in push mode comprises in particular a micro-slip control for the clutch on the inside of the curve, wherein the clutch on the outside of the curve is controlled as a function of the clutch on the inside of the curve such that a first torque T1 transmitted by the clutch on the outside of the curve corresponds to the second torque T2 of the clutch on the inside of the curve, said second torque T2 having been varied by a factor K. The following thus applies in particular:

$$T1 = K*T2.$$

A third control strategy for the travel state of cornering in the pull mode comprises in particular a micro-slip control for the clutch on the outside of the curve, wherein the clutch on the inside of the curve is controlled as a function of the clutch on the outside of the curve, such that a first torque T1 transmitted by the clutch on the inside of the curve corresponds to the second torque T2 of the clutch on the outside of the curve, said latter torque having been varied by a factor K. The following thus applies in particular:

$$T2 = K*T1$$

In the second and the third control strategy, one clutch is in each case controlled by way of the micro-slip control, where the respective other clutch is operated (exclusively) as a function of this clutch controlled by the micro-slip control.

A factor K for converting the torque is in each case used for the second and the third control strategy herein. The factor K can be determined in the same manner for both control strategies.

The factor K is in particular not a constant but rather has a value between zero and 1 that varies depending on parameters. In special cases, such as, e.g., starting on a road surface that has a first coefficient of friction for the one wheel of the axle and a different second coefficient of friction for the other wheel, the factor can also be greater than 1.

Such a special case comprises, e.g., cornering in the pull mode, wherein the wheel on the outside of the curve is situated on an icy surface (with a very low coefficient of friction). In this case, the wheel on the inside of the curve (or the clutch on the inside of the curve, respectively) must also be able to transmit a significantly greater torque, since the motor vehicle would otherwise come to a standstill. The factor here can also be between 1 and 10.

The factor is in particular determined as a function of at least one of the following parameters:
- a steering lock angle of a steering system (e.g. a steering wheel) of the motor vehicle;
- a speed of the motor vehicle;
- a minimum torque differential between a wheel on the inside of the curve and a wheel on the outside of the curve;
- a yaw rate differential (difference between a yaw rate measured on the motor vehicle and the theoretical yaw rate of the motor vehicle based on the steering movement; the yaw rate differential can be used to determine whether there is understeer or oversteer);
- a torque of the drive shaft;
- a speed differential of the wheels of the axle (e.g. between the wheel on the inside of the curve and the wheel on the outside of the curve).

In particular, one wheel of the common axle of the motor vehicle can in each case be connected to the drive unit in a torque-transmitting manner by activating each clutch.

The drive unit is preferably an electric machine (or an internal combustion engine). In particular, the electrical machine (or the internal combustion engine) can be the only drive unit used to drive the motor vehicle. In particular, there can also be a second driven axle, wherein a further drive unit (e.g. an internal combustion engine or a further electrical machine) for driving the second axle is preferably provided.

In particular, a torque differential between the drive shaft and the output shaft of more than zero revolutions per minute and of at most 5 revolutions per minute is set at the micro-slip control on the respective clutch.

Proposed is also a motor vehicle, at least having one drive system for at least one axle of the motor vehicle. The drive system has at least one drive unit, a drive shaft driven by the drive unit, a first output shaft and a second output shaft, as well as a first clutch connecting the drive shaft to the first output shaft and a second clutch connecting the drive shaft to the second output shaft, and furthermore a control unit for controlling the clutches, wherein the drive system is controlled with the described method according to one of the preceding claims. The control unit is in particular embodied and/or specified in a suitable manner for carrying out the method, or carries out the method respectively.

A transmission with a variable transmission ratio can be disposed between the drive unit and the output shafts. Variable transmission ratio means in particular that there is no single constant transmission ratio but that the transmission ratio can be varied, for example in stages or else continuously.

Alternatively, no transmission, or a transmission with a single fixed transmission ratio, can be disposed between the drive unit and the output shafts.

In particular, the two clutches for transmitting torques are disposed on one axle of a motor vehicle, so that by actuating the first clutch a first wheel of an axle and by actuating the second clutch a second wheel of the same axle of the motor vehicle is connected to the drive unit in a torque-transmitting manner. The clutches are therefore in particular not a clutch of a motor vehicle that is disposed between the drive unit and a shiftable transmission of the motor vehicle.

In particular, the axle is able to be steered by way of a steering system (e.g. comprising a steering wheel, e.g. actuatable by a driver so as to deflect the wheels of the axle) which has a steering drive (e.g. a power steering or similar) for actuating the steering. The steering system, proceeding from a non-deflected state (e.g. straight-ahead travel), can be deflected such that a steering angle of more than zero angular degrees is present.

The method can also be carried out by a computer or by a processor of a control unit, respectively.

Accordingly, a system for data processing (in particular a control device or part thereof, respectively) which comprises a processor which is adapted/configured in such a way that said processor executes the method or part of the steps of the proposed method, respectively, is also proposed.

A computer-readable storage medium which comprises instructions which, when executed by a computer/processor, cause the latter to carry out the method or at least some of the steps of the proposed method, respectively, can be provided.

The explanations relating to the method can in particular be applied to the motor vehicle, the system, the storage medium, or the computer-implemented method, and vice versa.

As a precaution, it should be noted that the numerals used here ("first", "second", . . . ) serve to distinguish a plurality of identical objects, variables or processes, i.e. in particular do not necessarily predefine any dependence and/or sequence of these objects, variables or processes with respect to one other. Should a dependence and/or sequence be required, it is explicitly stated here or it will be apparent to a person skilled in the art when studying the configuration specifically described.

SUMMARY OF THE DRAWINGS

The invention as well as the technical field will be explained in more detail hereunder with reference to the figures. It should be pointed out that the invention is not intended to be limited by the exemplary embodiments shown. In particular, unless explicitly stated otherwise, it is also possible to extract partial aspects of the substantive matter explained in the figures and to combine them with other constituent parts and knowledge from the present description and/or figures. The same reference signs denote the same objects and therefore where appropriate explanations from other figures can be used in a supplementary manner. In the figures, in each case schematically.

DESCRIPTION

Figure 1:
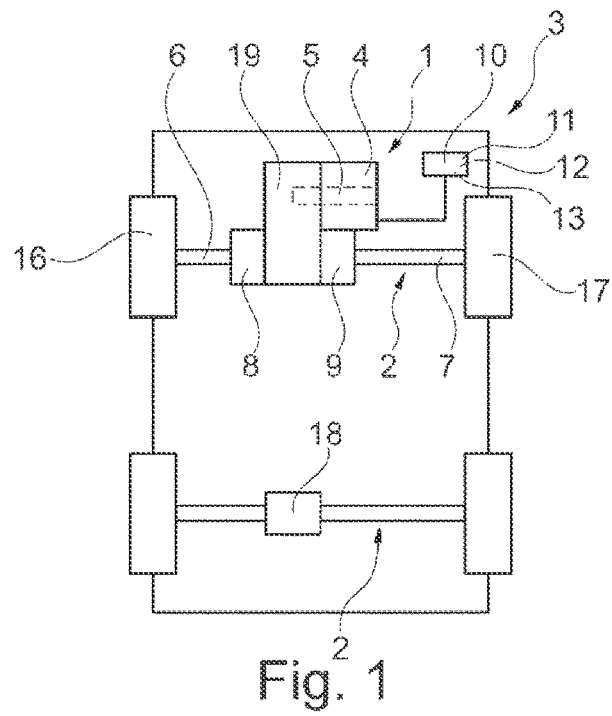
FIG. 1: shows a motor vehicle with a drive system for driving in each case one wheel of the motor vehicle.

FIG. 1 shows a motor vehicle 3 having a drive system 1 for driving a first wheel 16 and a second wheel 17 of a common axle 2 of the motor vehicle 3. The drive system 1 comprises a drive unit 4, a drive shaft 5 driven by the drive unit 4, a first output shaft 6 and a second output shaft 7, as well as a first clutch 8 connecting the drive shaft 5 to the first output shaft 6, and a second clutch 9 connecting the drive shaft 5 to the second output shaft 7. A control unit 10 for controlling the two clutches 8, 9 is furthermore provided.

Here, a drive system 1 is shown in which two clutches 8, 9 are provided on a common axle 2 of the motor vehicle 3, wherein one wheel 16, 17 of the motor vehicle 3 is in each case connected in a torque-transmitting manner to the drive unit 4 of the motor vehicle 3 by way of each of the two clutches 8, 9. The two clutches 8, 9 replace an otherwise usual differential 18 (illustrated here on the other axle of the motor vehicle), by means of which different speeds of the wheels can be compensated.

A transmission 19 is disposed between the drive unit 4 and the output shafts 6, 7.

Figure 2:
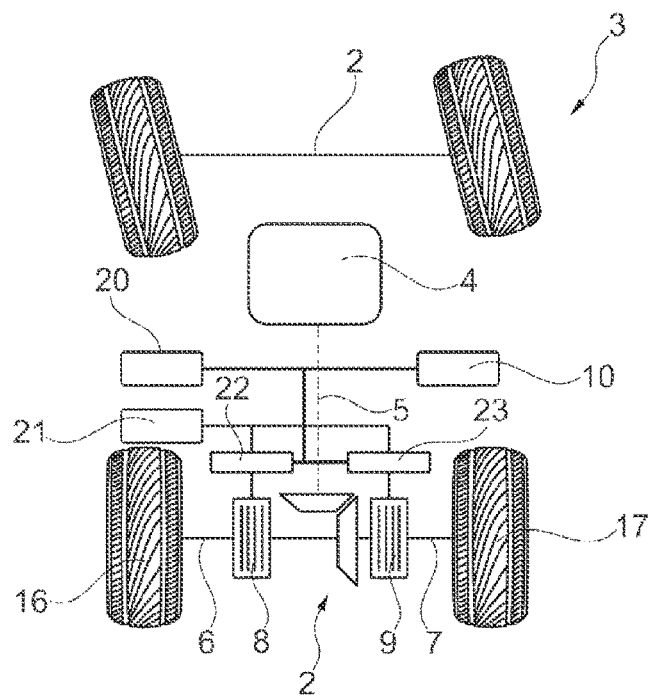
FIG. 2: shows a further motor vehicle.

FIG. 2 shows a further motor vehicle 3. Reference is made to the explanations pertaining to FIG. 1. Here, the drive unit 4 transmits the torque directly by way of the drive shaft 5 to the axle 2 or by way of the first clutch 8 to the first output shaft 6, and by way of the second clutch 9 to the second output shaft 7. The first clutch 8 is controlled by way of a first valve 22 and the second clutch 9 by way of a second valve 23. The valves 22, 23 are actuated in a controlled manner by a pump 21 driven by a pump motor 20.

Figure 3:
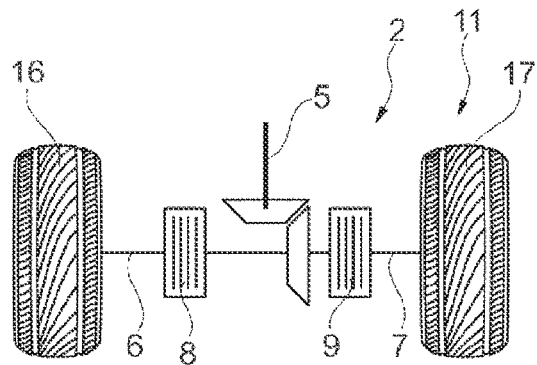
FIG. 3: shows an axle of the motor vehicle according to FIG. 2, said axle being controlled with the first control strategy.

FIG. 3 shows an axle 2 of the motor vehicle 3 according to FIG. 2, said axle 2 being controlled with the first control strategy 11.

The first control strategy 11 for the straight-ahead travel state comprises a mutually independent micro-slip control for the first clutch 8 and for the second clutch 9. This means that each clutch 8, 9 is controlled individually, in particular, for example (exclusively) as a function of the slip between the respective wheel 16, 17 and the road surface.

Figure 4:
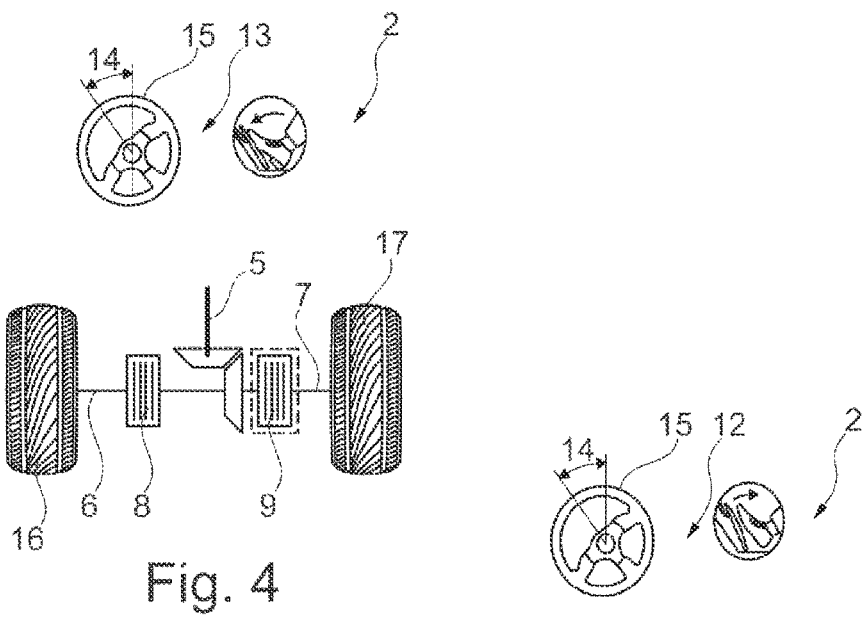
FIG. 4: shows the axle according to FIG. 3, said axle being controlled with the third control strategy.

FIG. 4 shows the axle 2 according to FIG. 3, said axle 3 being controlled with the third control strategy 13. Reference is made to the explanations pertaining to FIG. 3.

The third control strategy 13 for the cornering in the pull mode travel state comprises a micro-slip control for the clutch on the outside of the curve (here the second clutch 9), wherein the clutch on the inside of the curve (here the first clutch 8) is controlled as a function of the (second) clutch 9 on the outside of the curve such that a first torque transmitted by the (first) clutch 8 on the inside of the curve corresponds to the second torque of the (second) clutch 9 on the outside of the curve, the latter torque having been varied by a factor. The steering system 15 has a steering angle 14, so that the (first) wheel 16 on the inside of the curve and the (second) wheel 17 on the outside of the curve can be determined.

Figure 5:
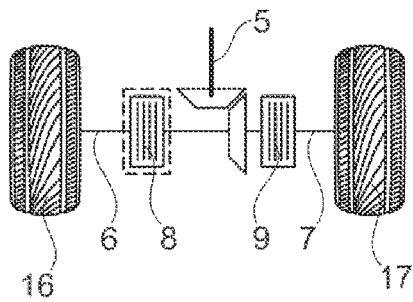
FIG. 5: shows the axle according to FIG. 3, said axle being controlled with the second control strategy.

FIG. 5 shows the axle 2 according to FIG. 3, said axle 2 being controlled with the second control strategy 12. Reference is made to the explanations pertaining to FIGS. 3 and 4.

The second control strategy 12 for the cornering in the push mode travel state comprises a micro-slip control for the clutch on the inside of the curve (here the first clutch 8), wherein the (second) clutch 9 on the outside of the curve is controlled as a function of the clutch 8 on the inside of the curve such that a first torque transmitted by the clutch 9 on the outside of the curve corresponds to the second torque of the clutch 8 on the inside of the curve, said latter torque having been varied by a factor.

In the second control strategy 12 and the third control strategy 13, one clutch 8, 9 is in each case controlled by way of the micro-slip control (indicated in each case by a dotted line in FIGS. 4 and 5), wherein the respective other clutch 9, 8 is operated as a function of this clutch 8, 9 that is controlled by the micro-slip control.

Figure 6:
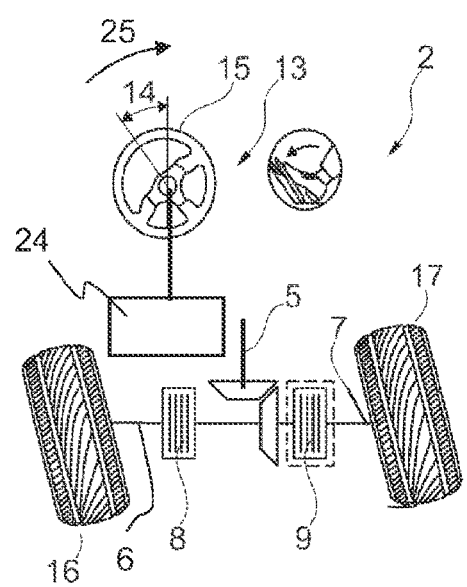
FIG. 6: shows a driven and steerable axle that is controlled with the third control strategy.

FIG. 6 shows a driven and steerable axle 2, which is controlled with the third control strategy 13. Reference is made to the explanations pertaining to FIG. 4.

The third control strategy 13 for the cornering in the pull mode travel state comprises a micro-slip control. The steering system 15 has a steering angle 14, so that the (first) wheel 16 on the inside of the curve and the (second) wheel 17 on the outside of the curve can be determined.

In the present case, the axle 2 can be steered by way of a steering system 15 (e.g. comprising a steering wheel, e.g. activatable by a driver so as to deflect the wheels 16, 17 of the axle 2) which has a steering drive 24 (e.g. power steering or similar) for activating the steering system 15. The steering system 15 proceeding from a non-deflected state (e.g. driving straight ahead or steering angle 14 of zero angular degrees) can be deflected such that a steering angle 14 greater than zero angular degrees is present.

When cornering in the pull mode, the steering drive 24 is impinged by an additional restoring torque 25 (dependent on the torque differential on the steered axle) for resetting the steering system 15 to the straight-ahead travel state.

LIST OF REFERENCE SIGNS

1 Drive system
2 Axle
3 Motor vehicle
4 Drive unit
5 Drive shaft
6 First output shaft
7 Second output shaft
8 First clutch
9 Second clutch
10 Control unit
11 First control strategy
12 Second control strategy
13 Third control strategy
14 Steering angle
15 Steering system
16 First wheel
17 Second wheel
18 Differential
19 Transmission
20 Pump motor
21 Pump
22 First valve
23 Second valve
24 Steering drive

The invention claimed is:

1. A method for controlling a drive system for an axle of a motor vehicle, the drive system having at least one drive unit, a drive shaft driven by the drive unit, a first output shaft and a second output shaft, as well as a first clutch connecting the drive shaft to the first output shaft and a second clutch connecting the drive shaft to the second output shaft, and furthermore comprising a control unit for controlling the clutches; wherein the clutches are operable at least at certain operating points with a micro-slip control in which a speed differential between the drive shaft and the output shaft of more than zero revolutions per minute and no more than 50 revolutions per minute is set at the respective clutch, wherein the method comprises:
   a) establishing a travelling state of the motor vehicle, wherein at least the following travel states are detected: traveling straight ahead, cornering in a push mode, and cornering in a pull mode; and
   b) selecting and applying one of a plurality of control strategies for each clutch, wherein the selected and applied control strategy is different for different travel states, and wherein the plurality of control strategies includes:
a first control strategy for a straight-ahead travel state;
a second control strategy for the cornering in the push mode travel state comprises a micro-slip control for the clutch on the inside of the curve, wherein the clutch on the outside of the curve as a function of the clutch on the inside of the curve is controlled so that a first outside torque transmitted by the clutch on the outside of the curve corresponds to a second inside torque of the clutch on the inside of the curve, said second inside torque having been varied by a factor; and
a third control strategy for the cornering in the pull mode travel state comprises a micro-slip control for the clutch on the outside of the curve, wherein the clutch on the inside of the curve is controlled as a function of the clutch on the outside of the curve such that a first inside torque transmitted by the clutch on the inside of the curve corresponds to a second outside torque of the clutch on the outside of the curve, said second outside torque having been varied by a second factor.

2. The method of claim 1, wherein the axle is steerable by a steering system which has a steering drive for actuating the steering system; wherein when cornering in the pull mode, the steering drive is impinged by a restoring torque for resetting the steering system toward the straight-ahead travel state.

3. The method of claim 2, wherein the restoring torque is determined as a function of at least one steering angle of the steering system or of a torque differential, wherein the torque differential is the difference between a first torque transmitted by way of the first clutch and a second torque transmitted by way of the second clutch.

4. The method of claim 2, wherein the steering system is automatically set to the straight-ahead travel state by way of the restoring torque.

5. The method of claim 1, wherein the first control strategy for the straight-ahead travel state comprises mutually independent micro-slip controls for the first clutch and for the second clutch.

6. The method of claim 5, wherein the first control strategy is used for the straight ahead travel state in the forward gear and in the reverse gear.

7. The method of claim 1, wherein the factor and/or the second factor is determined as a function of at least one of the following parameters:
a steering angle of a steering system of the motor vehicle;
speed of the motor vehicle;
minimum torque differential between a wheel on the inside of the curve and a wheel on the outside of the curve;
yaw rate;
torque of the drive shaft; or
speed differential of the wheels of the axle.

8. The method of claim 1, wherein by actuating each clutch, one wheel of the common axle of the motor vehicle can be connected in a torque-transmitting manner to the drive unit.

9. The method of claim 1, wherein the drive unit is an electric machine.

10. The method of claim 1, wherein a torque differential between the drive shaft and the output shaft of more than zero revolutions per minute and of at most 5 revolutions per minute is set at the micro-slip control on the respective clutch.

11. A control unit for a motor vehicle, the motor vehicle at least having a drive system for at least one axle of the motor vehicle, wherein the drive system has at least one drive unit, a drive shaft driven by the drive unit, a first output shaft and a second output shaft, and a first clutch connecting the drive shaft to the first output shaft and a second clutch connecting the drive shaft to the second output shaft, and furthermore a control unit for controlling the clutches, wherein the control unit comprises a computer including a processor and is configured for operating the drive system, including by:
a) establishing a travelling state of the motor vehicle, wherein at least the following travel states are detected: traveling straight ahead, cornering in a push mode, and cornering in a pull mode; and
b) selecting and applying one of a plurality of control strategies for each clutch, wherein the selected and applied control strategy is different for different travel states, and
wherein the plurality of control strategies include:
a first control strategy for a straight-ahead travel state;
a second control strategy for the cornering in the push mode travel state comprises a micro-slip control for the clutch on the inside of the curve, wherein the clutch on the outside of the curve as a function of the clutch on the inside of the curve is controlled so that a first outside torque transmitted by the clutch on the outside of the curve corresponds to a second inside torque of the clutch on the inside of the curve, said second inside torque having been varied by a factor; and
a third control strategy for the cornering in the pull mode travel state comprises a micro-slip control for the clutch on the outside of the curve, wherein the clutch on the inside of the curve is controlled as a function of the clutch on the outside of the curve such that a first inside torque transmitted by the clutch on the inside of the curve corresponds to a second outside torque of the clutch on the outside of the curve, said second outside torque having been varied by a second factor.

12. The control unit of claim 11, wherein the axle is steerable by a steering system which has a steering drive for actuating the steering system; wherein when cornering in the pull mode, the steering drive is impinged by a restoring torque for resetting the steering system toward the straight-ahead travel state.

13. The control unit of claim 12, wherein the restoring torque is determined as a function of at least one steering angle of the steering system or of a torque differential, wherein the torque differential is the difference between a first torque transmitted by way of the first clutch and a second torque transmitted by way of the second clutch.

14. The control unit of claim 13, wherein the steering system is automatically set to the straight-ahead travel state by way of the restoring torque.

15. The control unit of claim 11, wherein the first control strategy for the straight-ahead travel state comprises mutually independent micro-slip controls for the first clutch and for the second clutch.

16. The control unit of claim 15, wherein a torque differential between the drive shaft and the output shaft of more than zero revolutions per minute and of at most 5 revolutions per minute is set at the micro-slip control on the respective clutch.

* * * * *